United States Patent [19]
Milton

[11] Patent Number: 6,035,739
[45] Date of Patent: Mar. 14, 2000

[54] ADJUSTABLE STEERING COLUMN FOR MOTOR VEHICLE

[75] Inventor: Thomas James Milton, Bay City, Mich.

[73] Assignee: General Motors Corporation, Detroit, Mich.

[21] Appl. No.: 09/045,575

[22] Filed: Mar. 20, 1998

[51] Int. Cl.[7] .................................................. B62D 1/18
[52] U.S. Cl. ................. 74/493; 74/531; 280/775
[58] Field of Search ..................... 74/493, 531; 280/775

[56] References Cited

U.S. PATENT DOCUMENTS

| | | | |
|---|---|---|---|
| 3,167,971 | 2/1965 | Zeigler et al. | 74/493 |
| 3,245,282 | 4/1966 | Kimberlin | 74/493 |
| 3,252,350 | 5/1966 | Zeigler | 74/493 |
| 3,258,987 | 7/1966 | Zeigler et al. | 74/493 |
| 3,267,766 | 8/1966 | Glover et al. | 74/493 |
| 3,285,090 | 11/1966 | Cranbury | 74/493 |
| 3,382,944 | 5/1968 | Zeigler et al. | 180/111 |
| 3,386,309 | 6/1968 | Reed et al. | 74/493 |
| 3,396,600 | 8/1968 | Zeigler et al. | 74/493 |
| 4,753,121 | 6/1988 | Kenable et al. | 74/493 |
| 4,970,910 | 11/1990 | Cymbal | 74/493 |
| 4,972,732 | 11/1990 | Vemable et al. | 74/493 |
| 5,363,716 | 11/1994 | Budzik, Jr. et al. | 74/493 |
| 5,711,189 | 1/1998 | Cartwright et al. | 74/493 |
| 5,813,289 | 9/1998 | Renick et al. | 74/493 |

*Primary Examiner*—David A. Bucci
*Assistant Examiner*—William C Joyce
*Attorney, Agent, or Firm*—Edmund P. Anderson

[57] ABSTRACT

A motor vehicle steering column including a stationary mast jacket, an adjustable mast jacket supported on the stationary mast jacket for linear translation, and a tilt housing supported on the adjustable mast jacket for up and down pivotal movement. A lock shoe is supported on the tilt housing for pivotal movement between locking and releasing positions to secure and release the tilt housing for vertical adjustment of the steering column. A connecting rod attached to the adjustable mast jacket includes a shank slidably disposed in the middle of a coil torsion spring on the stationary mast jacket. The coil torsion spring grips the shank of the connecting rod to secure the position of the adjustable mast jacket. An actuating lever is pivotable between locking and releasing positions and twists the coil torsion spring to release the connecting rod. A manual release lever pivotally supported on the tilt housing bears directly against the lock shoe and is connected to the actuating lever through a tension member. The lock shoe releases the tilt housing before the coil torsion spring releases the shank of the connecting rod thereby affording the option of vertical adjustment of the steering column independent of horizontal adjustment.

5 Claims, 3 Drawing Sheets

ADJUSTABLE STEERING COLUMN FOR MOTOR VEHICLE

TECHNICAL FIELD

This invention relates to adjustable motor vehicle steering columns.

BACKGROUND OF THE INVENTION

U.S. Pat. No. 3,245,282, issued Apr. 12, 1966 and assigned to the assignee of this invention, describes an adjustable motor vehicle steering column including a stationary mast jacket on a body of the motor vehicle, an adjustable mast jacket supported on the stationary mast jacket for linear translation, a tilt housing supported on the adjustable mast jacket for up and down pivotal movement, and a steering hand wheel rotatably supported on the tilt housing. Linear translation of the adjustable mast jacket and pivotal movement of the tilt housing adjusts the horizontal and vertical positions, respectively, of the steering hand wheel. A pair of side-by-side connecting rods attached to respective ones of the tilt housing and the adjustable mast jacket translate linearly during linear translation of the adjustable mast jacket and/or pivotal movement of the tilt housing. The connecting rods extend through apertures in a pair of levers pivotally supported on the stationary mast jacket. A spring biases the levers apart to tightly wedge the connecting rods in the apertures therein and thereby secure the positions of the adjustable mast jacket and the tilt housing. For vertical and/or horizontal adjustment of the steering column, a manually actuated tension member pulls the levers together to concurrently release both connecting rods. An adjustable motor vehicle steering column according to this invention is a novel alternative to the motor vehicle steering column described in the aforesaid U.S. Pat. No. 3,245,282.

SUMMARY OF THE INVENTION

This invention is a new and improved adjustable motor vehicle steering column including a stationary mast jacket, an adjustable mast jacket supported on the stationary mast jacket for linear translation, and a tilt housing supported on the adjustable mast jacket for up and down pivotal movement. A lock shoe is supported on the tilt housing for pivotal movement between locking and releasing positions to secure and release the tilt housing relative to the adjustable mast jacket for vertical adjustment of the steering column. A connecting rod is attached to the adjustable mast for linear translation as a unit therewith and includes a shank slidably disposed in the middle of a coil torsion spring mounted in a spring housing on the stationary mast jacket. The coil torsion spring grips the shank of the connecting rod to secure the position of the adjustable mast jacket. An actuating lever on the spring housing is pivotable between locking and releasing positions and twists the coil torsion spring to release the shank of the connecting rod for horizontal adjustment of the steering column. A manual release lever pivotally supported on the tilt housing bears directly against the lock shoe and is connected to the actuating lever through a tension member. During pivotal movement of the manual release lever, the lock shoe releases the tilt housing before the coil torsion spring releases the shank of the connecting rod thereby affording the option of vertical adjustment of the steering column independent of horizontal adjustment.

DESCRIPTION OF THE PREFERRED EMBODIMENT

Figure 1:
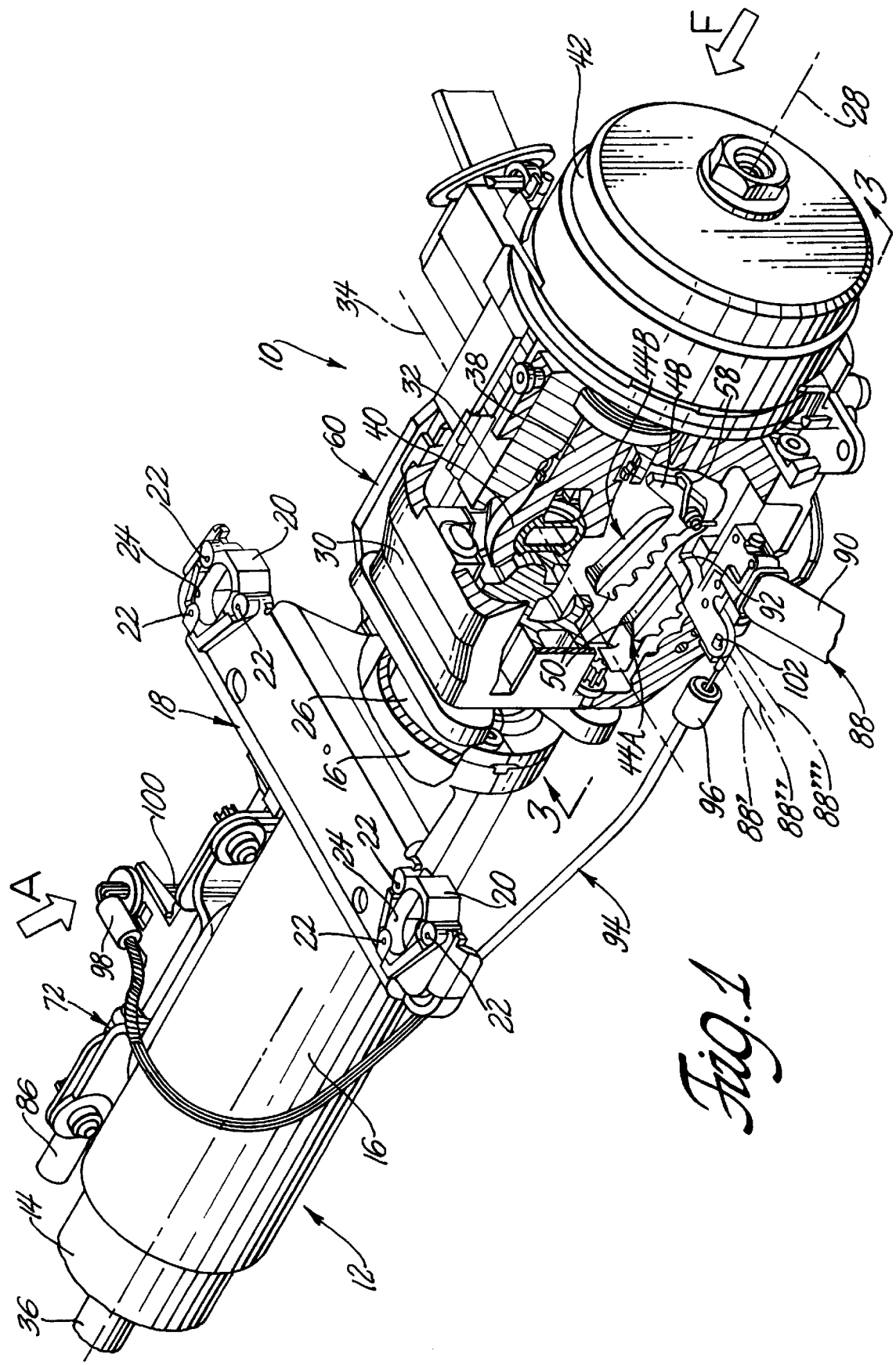
FIG. 1 is a fragmentary partially broken-away perspective view of a motor vehicle steering column according to this invention.
Figure 2:
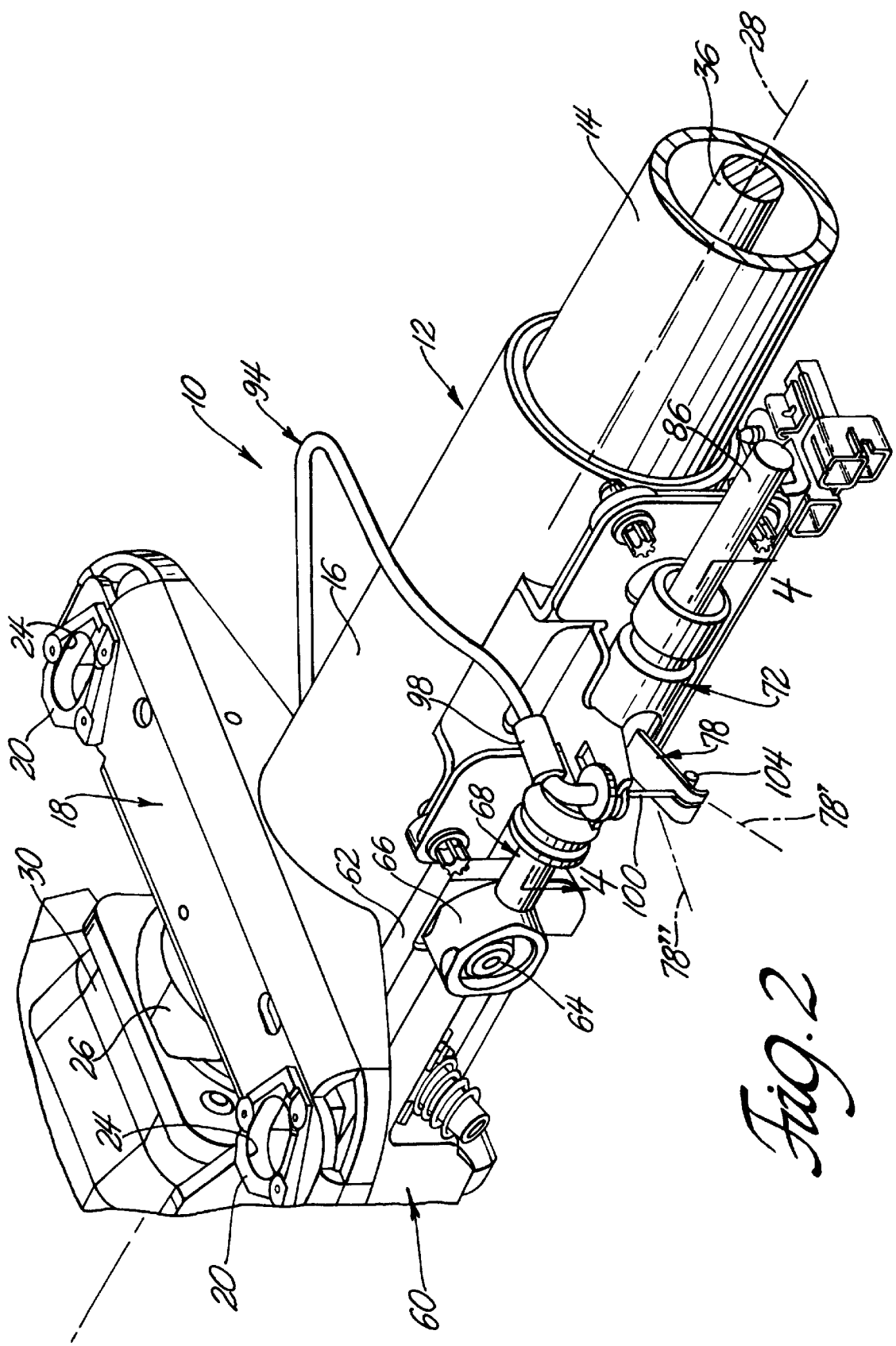
FIG. 2 is a fragmentary perspective view of the motor vehicle steering column according to this invention taken generally in the direction of arrow "A" in FIG. 1.
Figure 3:
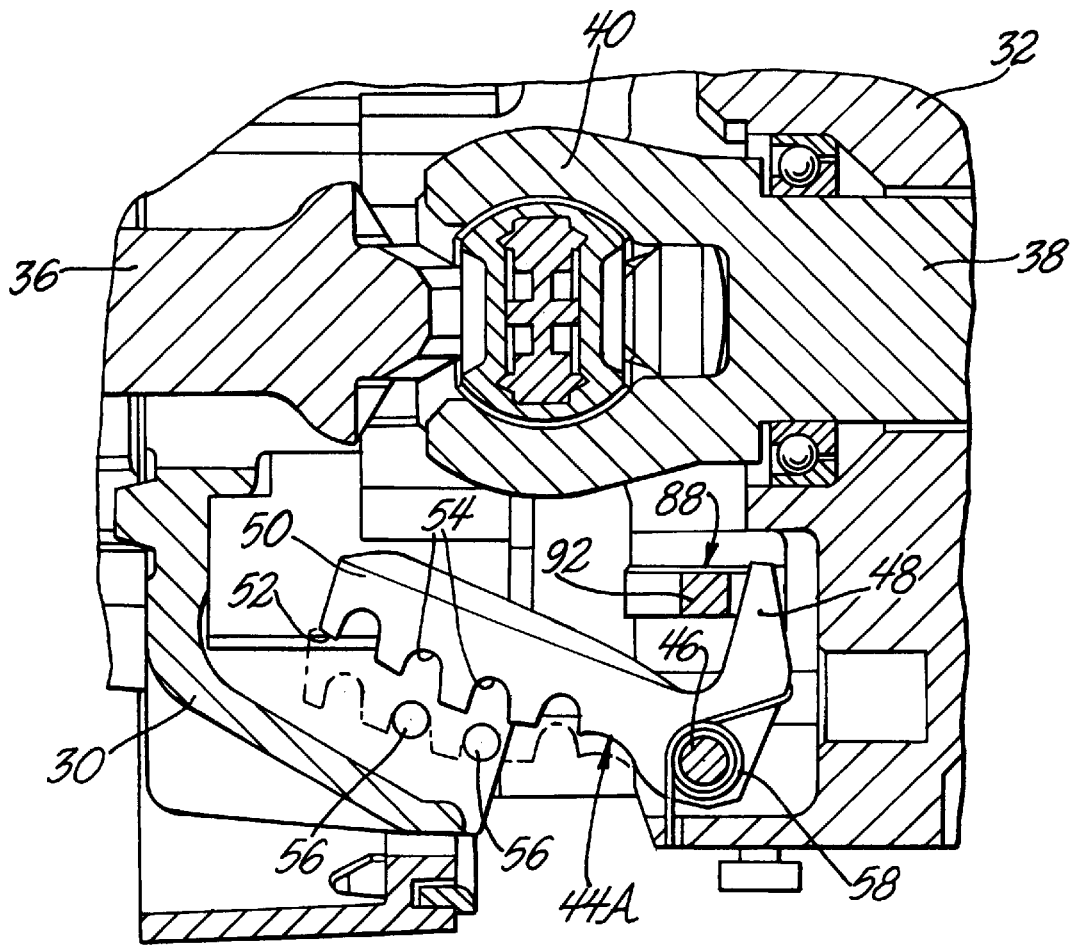
FIG. 3 is an enlarged sectional view taken generally along the plane indicated by lines 3—3 in FIG. 1.

Referring to FIGS. 1–3, a motor vehicle steering column 10 according to this invention includes a stationary mast jacket 12 consisting of a tubular lower mast jacket 14 and a tubular upper mast jacket 16 telescopically overlapping the lower mast jacket. The lower mast jacket is connected to a structural element, not shown, of a motor vehicle body generally near the front of a passenger compartment of the vehicle body. The upper and the lower mast jackets 16,14 are rigidly coupled by an energy absorber, not shown, such as described in U.S. Pat. No. 3,392,599, issued Jul. 16, 1968 and assigned to the assignee of this invention, disposed in the overlap between the upper and the lower mast jackets.

A mounting bracket 18 is rigidly attached to the upper mast jacket. A pair of capsules 20 are seated in a corresponding pair of open slots in the mounting bracket and secured by a plurality of plastic shear pins 22. Each capsule 20 has an elongated aperture 24 therein. A pair of hanger bolts, not shown, on the body of the motor vehicle extend down through the apertures 24 in respective ones of the capsules 20. Fasteners, not shown, on the hanger bolts below the capsules rigidly clamp the capsules to another structural element, not shown, of the vehicle body. An impact on the steering column 10 in the direction of a schematic force vector "F", FIG. 1, fractures the plastic pins 22 and collapses the upper mast jacket over the lower mast jacket against a controlled resistance attributable to the aforesaid energy absorber whereby a fraction of the kinetic energy of the impact is converted into work.

A tubular adjustable mast jacket 26 is supported on the aforesaid stationary mast jacket 12 for linear translation in the direction of a longitudinal centerline 28 of the steering column by slide bearings, not shown. A suitable slide bearing arrangement is described in U.S. Pat. No. 5,590,565, issued Jan. 7, 1997 and assigned to the assignee of this invention, the disclosure of which is incorporated herein by reference. The adjustable mast jacket 26 terminates outboard of the upper mast jacket 16 at an enlarged head portion 30. A tilt housing 32 of the steering column 10 is supported on the enlarged head portion 30 of the adjustable mast jacket 26 for up and down pivotal movement about a lateral centerline 34 of the steering column.

As seen best in FIGS. 1 and 3, a lower steering shaft 36 is supported on the stationary mast jacket 12 for rotation about the longitudinal centerline 28 of the steering column. An upper steering shaft 38 is rotatably supported on the tilt housing 32 and connected to the lower steering shaft 36 through a fragmentarily illustrated universal coupling 40 at the intersection of the longitudinal and lateral centerlines 28,34. A steering hand wheel, not shown, is rigidly attached to the upper steering shaft 38 over a coil housing 42 of a supplemental inflation restraint system, not shown, on the steering column. Linear translation of the adjustable mast jacket 26 in the direction of the longitudinal centerline 28 of the steering column varies the horizontal position of the steering hand wheel and constitutes horizontal adjustment of the steering column. Up and down pivotal movement of the tilt housing 32 about the lateral centerline 34 of the steering column varies the vertical position of the steering hand wheel and constitutes vertical adjustment of the steering column.

With continuing reference to FIGS. 1 and 3, a pair of L-shaped lock shoes 44A,44B are supported on a journal pin 46 on the tilt housing 32 for pivotal movement in parallel planes perpendicular to the lateral centerline 34 of the steering column. Each of the lock shoes has a vertical leg 48 and a horizontal leg 50. A lower edge 52, FIG. 3, of the horizontal leg 50 of each of the lock shoes is interrupted by a plurality of evenly spaced notches 54 facing a pair of rigid anchor pins 56 on the enlarged head portion 30 of the adjustable mast jacket 26. Respective ones of a pair of hairpin springs 58 bias the lock shoes 44A,44B counterclockwise, FIGS. 1 and 3.

Each of the lock shoes 44A,44B is pivotable between a locking position and a releasing position illustrated, respectively, in broken lines and in solid lines in FIG. 3. In the locking positions of the lock shoes, one or more of the notches 54 engage one or more of the anchor pins 56 to rigidly secure the angular position of the tilt housing 32 relative to the adjustable mast jacket 26. In the releasing positions of the lock shoes 44A,44B, the notches 54 are disengaged from the anchor pins 56 to release the tilt housing for vertical adjustment of the steering column through up and down pivotal movement of the tilt housing. In conventional fashion, the notches 54 in the lock shoe 44A are offset relative to the notches 54 in the lock shoe 44B to maximize the number of angular positions in which the tilt housing may be secured.

Figure 4:
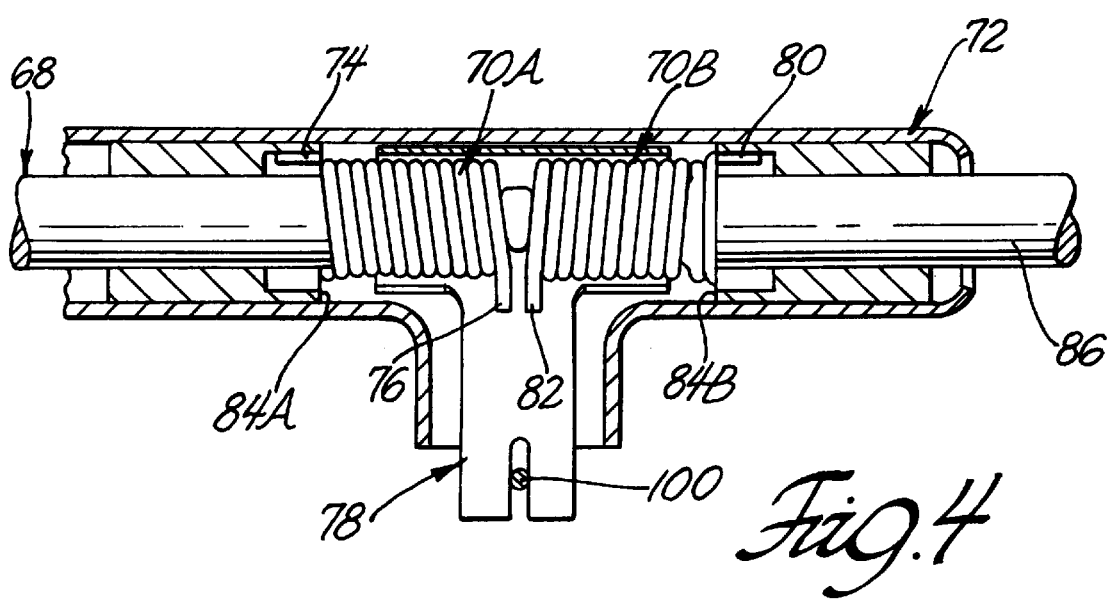
FIG. 4 is an enlarged sectional view taken generally along the plane indicated by lines 4—4 in FIG. 2.

As seen best in FIGS. 1, 2 and 4, a flat thrust plate 60 is attached to the enlarged head portion 30 of the adjustable mast jacket 26 for linear translation as a unit with the adjustable mast jacket in the direction of the longitudinal centerline 28 of the steering column. The thrust plate 60 has a tail portion 62, FIG. 2, to which is rigidly attached a ball stud 64. A socket 66 on an end of a connecting rod 68 seats on the ball stud 64 and cooperates therewith and with the thrust plate 60 in coupling the connecting rod to the adjustable mast jacket for linear translation as a unit therewith relative to the stationary mast jacket.

A pair of opposite hand coil torsion springs 70A,70B, FIG. 4, are disposed in a spring housing 72 rigidly attached to the stationary mast jacket 12. The coil torsion spring 70A has a first end 74 in a slot in the spring housing 72 and a splayed second end 76 bearing against an actuating lever 78 pivotally supported on the spring housing. The coil torsion spring 70B has a first end 80 in a slot in the spring housing 72 and a splayed second end 82 bearing against the actuating lever 78. The coil torsion springs 70A,70B are trapped in the spring housing 72 between a pair of end walls 84A,84B of the latter.

A cylindrical shank 86 of the connecting rod 68 extends through the middle of each of the coil torsion springs 70A,70B and is supported on the spring housing 72 for back and forth linear translation. The coil torsion springs grip tightly against the shank 86 of the connecting rod. The actuating lever 78 has an upward or clockwise angular stroke, FIG. 2, from a locking position 78' corresponding to the coil torsion springs 70A,70B fully gripping the shank 86 of the connecting rod to a releasing position 78". In the interval between the locking and releasing positions 78',78" of the actuating lever, the coil torsion springs 70A,70B are twisted in a direction inducing expansion of the inside diameters thereof. In the locking position 78' of the actuating lever 78, the coil torsion springs secure the linear position of the adjustable mast jacket 26 through the thrust plate 60 and the connecting rod 68. In the releasing position 78" of the actuating lever, the coil torsion springs are expanded to where the shank 86 of the connecting rod is fully released for unobstructed linear translation of the adjustable mast jacket relative to the stationary mast jacket and corresponding horizontal adjustment of the steering column 10.

As seen best in FIGS. 1 and 3, a manual release lever 88 includes a hand grip 90 and a cross bar 92 rigidly connected to the hand-grip. The cross bar 92 traverses the tilt housing in front of the vertical legs 48 of the lock shoes 44A,44B and is supported on the tilt housing for pivotal movement in a plane parallel to the upper steering shaft 38. A flexible tube 94 has a first end 96 rigidly connected to the tilt housing 32 and a second end 98 rigidly connected to the stationary mast jacket 12 at the spring housing 72. A tension member 100 is supported in the flexible tube 94 for back and forth linear translation. The tension member 100 is connected to the cross bar 92 through a hooked end 102 of the tension member in a socket in the cross bar. The tension member 100 is connected to the actuating lever 78 through a pin 104 on the end of the tension member bearing against the underside of the actuating lever.

In the absence of manual effort applied at the hand grip 90 of the manual release lever 88, the angular position of the tilt housing 32 is secured by engagement of one of the lock shoes 44A,44B on the anchor pins 56 under the bias of the corresponding one of the hairpin springs 58. Likewise, the linear position of the adjustable mast jacket 26 is secured by the coil torsion springs 70A,70B through their grip on the shank 86 of the connecting rod 68 and the coupling between the connecting rod and the adjustable mast jacket defined by the flat thrust plate 60. At the same time, the actuating lever 78 pulls the pin 104 on the end of the tension member 100 down, FIG. 2, to locate the manual release lever in a locking position 88', FIG. 1.

With the positions of the tilt housing 32 and the adjustable mast jacket 26 thus secured, an impact on the upper end of the steering column 10 in the direction of the schematic force vector "F", FIG. 1, is reacted to the stationary mast jacket through the tilt housing and the adjustable mast jacket. Force attributable to such impact fractures the plastic shear pins 22 to release the upper mast jacket 16 of the stationary mast jacket for linear telescopic collapse over the lower mast jacket 14 of the stationary mast jacket against the controlled resistance attributable to the aforesaid energy absorber.

To adjust the steering column, an operator grasps the hand grip 90 and pivots the manual release lever 88 toward the top of the steering column to either a partial release position 88" or a full release position 88'". The cross bar 92 engages directly the vertical legs 48 of the lock shoes 44A,44B and pivots each from its locking position toward its releasing position. At the same time, the actuating lever 78 on the spring housing 72 is pivoted from its locking position 78' toward its releasing position 78" by the cross bar 92 through the tension member 100.

The angular interval between the locking and intermediate releasing positions 88',88" of the manual release lever 88 is coordinated with the angular intervals between the locking and releasing positions of the lock shoes 44A,44B and with the angular interval between the locking and releasing positions 78',78" of the actuating lever 78 to afford the option of vertical adjustment of the steering column independent of horizontal adjustment. That is, each of the lock shoes 44A,44B attains its releasing position concurrent with the manual release lever 88 attaining its intermediate releasing position 88" whereas the actuating lever 78 only partially traverses the angular interval between its locking position 78' and its releasing position 78". In such intermediate position of the actuating lever 78, not shown, the coil torsion springs 70A,70B are not twisted enough to fully release the shank 86 of the connecting rod 68. The correspondingly loosened grip of the coil torsion springs 70A,70B on the shank of the connecting rod is, none the less, still sufficient to be perceived by the operator as continued rigid immobilization of the adjustable mast jacket 26 which perceived rigid immobilization simplifies vertical adjustment of the steering column.

To adjust the steering column 10 horizontally or both horizontally and vertically, the operator pivots the manual release lever 88 beyond its intermediate releasing position 88" to its full releasing position 88'". In the interval between the intermediate releasing and full releasing positions, the cross bar 92 pivots the lock shoes 44A,44B harmlessly beyond their releasing positions while the tension member 100 concurrently pivots the actuating lever 78 all the way to its releasing position 78". In that circumstance, the tilt housing 32 remains released for vertical adjustment of the steering column and the coil torsion springs 70A,70B are twisted enough to fully release the shank 86 of the connecting rod 68 for unobstructed horizontal adjustment of the steering column.

When comfortable vertical and horizontal positions of the steering column 10 are achieved, the operator releases the hand grip 90. The coil torsion springs 70A,70B pivot the actuating lever 78 back to its locking position 78' corresponding to the coil torsion springs rigidly gripping the shank 86 of the connecting rod to once again secure the linear position of the adjustable mast jacket 26. At the same time, the operating lever 78 returns the manual release lever 88 to its locking position 88' through the tension member 100 and the hairpin springs 58 pivot the lock shoes to their respective locking positions to once again secure the angular position of the tilt housing 32 by engagement of the notches 54 on the anchor pins 56. In the event that none of the notches 54 register with the anchor pins 56, the hairpin springs 58 bias the edges 52 of the horizontal legs of the lock shoes against the anchor pins until registry is attained by slight additional up or down pivotal movement of the tilt housing.

Having thus described the invention, what is claimed is:

1. A motor vehicle steering column including
   a stationary mast jacket,
   an adjustable mast jacket supported on said stationary mast jacket for linear translation to effect horizontal adjustment of said steering column,
   a tilt housing supported on said adjustable mast jacket for up and down pivotal movement to effect vertical adjustment of said steering column, and a steering shaft rotatably supported on said tilt housing,
   a manual release lever supported on said tilt housing for pivotal movement in a plane parallel to said steering shaft between a locking position and an intermediate releasing position and a full releasing position,
   a vertical adjustment lock means mounted on said tilt housing and on said adjustable mast jacket operative to secure said tilt housing in any one of a plurality of angular positions in said locking position of said manual release lever and to release said tilt housing for unobstructed up and down pivotal movement in response to pivotal movement of said manual release lever in said plane parallel to said steering shaft from said locking position to said intermediate releasing position thereof, and
   a horizontal adjustment lock means mounted on said stationary mast jacket and on said adjustable mast jacket operative to secure said adjustable mast jacket against linear translation in each of said locking position and said intermediate releasing position of said manual release lever and to release said adjustable mast jacket for unobstructed linear translation in response to pivotal movement of said manual release lever in said plane parallel to said steering shaft from said intermediate releasing position to said full releasing position.

2. The motor vehicle steering column recited in claim 1 wherein said vertical adjustment lock means comprises:
   an anchor pin rigidly attached to said adjustable mast jacket,
   a lock shoe supported on said tilt housing for pivotal movement relative to said tilt housing through an angular interval including a locking position of said lock shoe and a releasing position of said lock shoe,
   a notch in said lock shoe engaging said anchor pin in said locking position of said lock shoe to secure said tilt housing against pivotal movement and disengaged from said anchor pin in said releasing position of said lock shoe to release said tilt housing for unobstructed up and down pivotal movement, and
   a connecting means operative to pivot said lock shoe from said locking position thereof to said releasing position thereof concurrent with pivotal movement of said manual release lever in said plane parallel to said steering shaft from said locking position thereof to said intermediate releasing position thereof and to pivot said lock shoe through a segment of the angular interval of said lock shoe beyond said locking position thereof concurrent with pivotal movement of said manual release lever in said plane parallel to said steering shaft from said intermediate releasing position thereof to said full releasing position thereof.

3. The motor vehicle steering column recited in claim 2 wherein said connecting means operative to pivot said lock shoe comprises:
   a cross bar on said manual release lever pivotable as a unit therewith relative to said tilt housing in said plane parallel to said steering shaft, and
   a leg on said lock shoe engaged directly by said cross bar on said manual release lever during pivotal movement of said manual release lever in said plane parallel to said steering shaft from said locking position thereof to each of said intermediate releasing and said full releasing positions thereof.

4. The motor vehicle steering column recited in claim 3 wherein said horizontal adjustment lock means mounted on said stationary mast jacket and on said adjustable mast jacket comprises:
   a connecting rod attached to said adjustable mast jacket for linear translation as a unit therewith,
   a shank on said connecting rod,
   a pair of opposite hand coil torsion springs mounted on said stationary mast jacket each encircling and rigidly gripping said shank on said connecting rod to secure said connecting rod and said adjustable mast jacket attached thereto against linear translation,
   an actuating lever supported on said stationary mast jacket for pivotal movement between a locking position and a releasing position, a splayed end on each of said pair of opposite hand coil torsion springs bearing against said actuating lever and biasing said actuating lever to said locking position thereof concurrent with each of said opposite hand coil torsion springs encircling and rigidly gripping said shank on said connecting rod, said actuating lever cooperating with said splayed end on each of said pair of opposite hand coil torsion springs in twisting each of said pair of opposite hand coil torsion springs in a direction operative to expand an inside diameter of each of said pair of opposite hand coil torsion springs so that said shank on said connecting rod is fully released in said releasing position of said actuating lever, and a connecting means between said manual release lever and said actuating lever operative to pivot said actuating lever only partially from said locking position thereof to said releasing position thereof in said intermediate releasing position of said manual release lever so that each of said pair of opposite hand coil torsion springs maintains a grip on said shank of said connecting rod in said intermediate releasing position of said manual release lever and to pivot said actuating lever to said releasing position thereof at said full releasing position of said manual release lever.

5. The motor vehicle steering column recited in claim 4 wherein said connecting means between said manual release lever and said actuating lever comprises:

a flexible tube having a first end attached to said tilt housing and a second end attached to said stationary mast jacket, and a tension member supported in said flexible tube for back and forth linear translation having a first end attached to said manual release lever and a second end attached to said actuating lever.

* * * * *